Dec. 19, 1967   R. W. LOGAN   3,358,370
COMPOSITE BLADE STRUCTURE
Filed Aug. 1, 1966   2 Sheets-Sheet 2

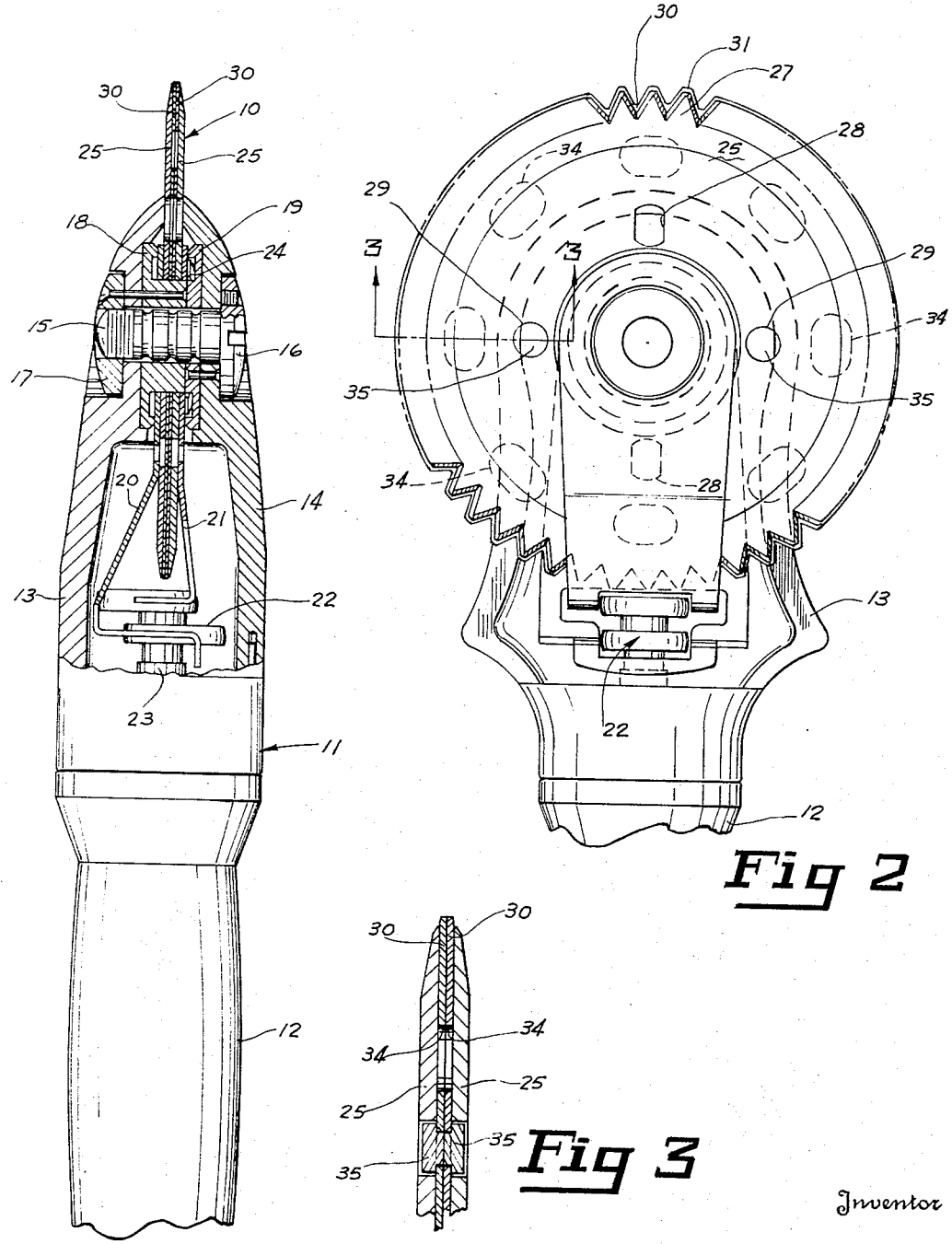

Inventor
RICHARD W. LOGAN
By Stephen E. Rockwell
Attorney

United States Patent Office 3,358,370
Patented Dec. 19, 1967

3,358,370
COMPOSITE BLADE STRUCTURE
Richard W. Logan, Brixham Road, York, Maine 03909
Filed Aug. 1, 1966, Ser. No. 569,136
5 Claims. (Cl. 30—347)

ABSTRACT OF THE DISCLOSURE

This disclosure deals with a composite blade structure which is well suited for use in a flaying implement and provides a pair of coacting disposable blade elements supported by backing members, in opposing relation to one another. The blade elements have toothed cutting edges on their peripheries. The blade elements are mounted on a common axis and are oscillated.

---

This invention relates to a composite blade structure which, while not limited thereto, is especially suitable for employment in a flaying implement. The implement may have two knife elements of disk form, each provided with cooperating cutting teeth on at least a portion of the periphery thereof, at least one of the knife elements being movable. The invention may be embodied in a flaying implement such as that illustrated in United States Letters Patent No. 2,974,413, issued Mar. 14, 1961, in which both knife elements are movable and driven by suitable means, and wherein the cutting blades are toothed entirely around their peripheries, the arrangement being such that the blades which oscillate, having exposed edge portions which become dulled through use, may be reversed so as to expose new or unused edge portions, all as shown and described in the aforementioned patent.

Heretofore each blade has been constructed as a single part formed from sufficient metal such as steel to give it the required strength, thereby necessitating a blade body which is of relatively substantial thickness. These blades were formed with cooperating teeth along at least portions of their peripheries, and it was found that in use only the tip portions of the teeth became worn. However, when these tip portions became worn, the blades could not be reused until reground. The regrinding of such blades often proved to be an inconvenience to the user of the implement and, because of the nature of the grinding operation required, the regrinding of cutting blades was often costly.

It is an object of the invention to provide a composite blade structure well suited for application to a flaying implement such as described above, having one or more disposable blade elements.

A further object of the invention is to provide a disklike blade element having cutting teeth extending along at least a portion of its periphery to cooperate with a companion or mating blade element.

Still another object of the invention is to provide such a blade element with a suitable backing or supporting member, which member may be oscillated or rotated, if desired, the blade element being provided with driving means of connection between it and its supporting member.

Still another object of the invention is to provide simple means of connection between a disposable blade and its support, the means being formed on the former to prevent angular movement of the blade and its support.

Yet another object of the invention is to provide in such a composite blade structure means for dissipating heat generated in the blade element in use of the latter.

Further objects of the invention will be apparent from the following detailed description of a presently preferred embodiment of the invention when viewed with the accompanying drawings.

In the drawings:

FIG. 1 is a fragmentary, median sectional view of a composite blade structure embodying the invention, incorporated in a flaying implement;

FIG. 2 is a fragmentary elevational view of the structure with the housing cap of the flaying implement removed;

FIG. 3 is an enlarged sectional view taken on line 3—3 of FIG. 2;

Figures 4, 5:
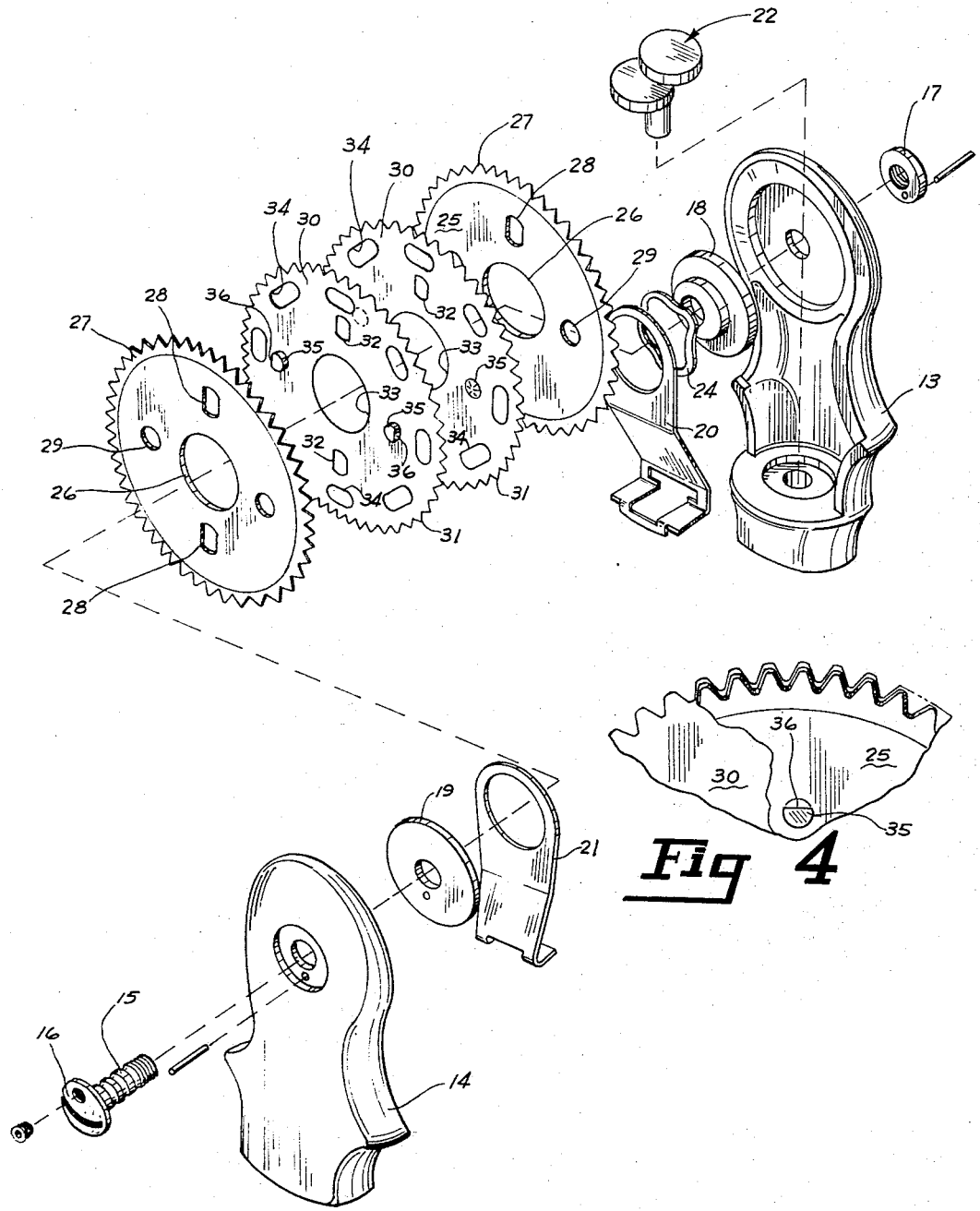
FIG. 4 is a fragmentary, broken-away view of the blade structure similar to FIG. 2, further illustrating the structure.
FIG. 5 is an exploded view of the structure shown in FIG. 1.

In the drawings, the composite blade structure embodying the invention is indicated generally at 10 and illustrated as applied to a flaying implement generally similar to that illustrated and described in the aforementioned patent, the implement having a housing indicated generally at 11 provided with a handle portion 12. The housing 11 includes a body 13 and a cooperating cap 14.

The blade structure 10 is supported in the housing in a manner to provide an exposed portion of the former in the manner shown in FIG. 1, for example, the blade structure being supported on a center alignment shaft 15 extending through an aperture in the blade structure, having a slotted head 16 cooperating with the cap 14 and a threaded end receiving a nut 17 cooperating with the body 13. As shown in the drawings, the body 13 and the cap 14 define therebetween an opening through which the disklike blade structure 10 extends.

Within the body 13 and surrounding the shaft 15 is a bearing element 18 cooperating with a bearing element 19 within the cap 14 and also in embracing relationship to the shaft 15. The bearing elements 18 and 19 together provide a central support for the blade structure having a central aperture as previously indicated through which it is supported.

As shown in FIG. 1, the bearing element 18 extends through an aperture in a long yoke member 20 and a similar aperture in a short yoke member 21. Both yoke members cooperate with an eccentric indicated generally at 22 driven from a shaft 23 extending within the housing in a manner to operate the composite blade structure. The construction of the housing of the flaying implement, the center shaft and bearing elements, the yoke members and the shaft-driven eccentric form no part of the present invention, and these elements need not be further described as similar parts are fully shown and described in United States Letters Patent No. 2,974,413.

As shown in the drawings, the blade structure 10 is sandwiched between the yoke members 20 and 21, and a washerlike spring 24 is provided reacting between the yoke member 21 and the bearing element 19, tending to maintain the yoke members in intimate relation with the blade structure. The last-mentioned structure includes a pair of supporting or backing members 25 of disk form, each having a central aperture 26 for receiving the bearing 18. It will be noted that in the illustrated form of the invention the backing members 25 are toothed throughout their peripheries as at 27. These teeth may have the outline best shown in FIGS. 2 and 4 and, while they are not sharp, they may have inclined edge portions, to facilitate a cutting operation as will be understood from the following further description of the blade structure. As shown, each backing member 25 is provided with a pair of diametrically arranged slots 28 and a pair of diametrically arranged openings 29 therein.

One of the backing members 25 is driven in an oscillatory manner by the long yoke 20 having a stud received in one of the slots 28 of the backing member, while the other backing member 25 is driven in a similar manner through the short yoke 21 having a stud received in one of the slots 28 formed in the last-mentioned backing member, the arrangement being such that the backing members are simultaneously oscillated in opposite directions to provide a scissorslike action between the teeth of the backing members. The aforementioned studs on the aforementioned yokes which cooperate in the aforementioned manner, one extending into each of the aligned openings 28 for driving purposes, have been omitted from the drawings for the purpose of simplification as they form no part of the present invention, but for a clear understanding as to how these studs effect a driving action, reference is made to the stud 40 of the yoke 34 and the stud 46 of the yoke 35 of the aforementioned patent 2,974,413.

As previously indicated, the members 25 have no cutting function but are merely provided for a supporting and backing function. Each backing member 25 supports one of a pair of disposable blade elements 30 having complementally formed teeth 31 thereon so dimensioned as to extend slightly beyond the edges (FIG. 4) of the teeth 27 of the backing member.

The blade elements 30 may be formed from a thin sheet of steel of a type which may be sharpened to a very keen cutting edge. Each blade element is provided with a pair of diametrically arranged slots 32 which, when the blade element is assembled with its backing member, register with the slots 28 of the latter when the teeth of the blade element are in registry with the teeth 27 of the last-mentioned backing member. It will also be noted that each blade element 30 has a central opening 33 registering with, and preferably the same diameter as, the opening 26 in the corresponding backing member 25. It will be appreciated that the opening 33 receives the bearing member 18 described above.

Largely for the purpose of reducing heat generated by friction in the composite blade structure during operation of the same, as in flaying or skinning the carcasses of animals in the preparation of foodstuffs as in the meat-packing industry, each blade element 30 is provided with voids 34 circumferentially arranged and spaced from one another as indicated in FIG. 5, for example. These voids serve a further function in that they tend during the use of the implement to entrap any foreign material working its way between the blade elements 30. As previously indicated, these elements are arranged in face-to-face relationship in the assembled cutter and oscillate relatively to one another during a cutting operation.

The voids 34 in each blade element 30 reduce the surface area of the element which bears against its companion to thereby tend to reduce friction between the blade elements, which friction without these voids 34 would tend to generate sufficient heat during the operation of the blades to cause them to bind. The voids are located radially of each blade element in a location spaced from but close to the teeth formed on the element where heat is generated in operation of the tool or flaying implement.

Obviously the voids 34 in each blade element tend to lighten the weight of the element which is also desirable. It will be further appreciated that the voids 34 in each blade element provide between the element and its companion backing member 25 a pocket, tending to entrap any material working between the blade elements in the operation of the tool, which foreign material might otherwise cause the blade elements 30 to separate and thereby interfere with the cutting action of the blade elements which have a scissorslike cutting action. It is well known that when the blades of a scissors tend to be forced apart during a cutting operation, the cutting efficiency of the scissors is reduced considerably and the cutting operation made more difficult.

As indicated in the drawings, the voids 34 in each blade element may be of substantial area. This may be done without structurally weakening the blade element, in the manner shown. As shown, the voids 34 of each blade element are elongated circumferentially of the element and are of substantial width. When the blade elements 30 are assembled, the voids in these elements substantially register with one another, as indicated particularly in the exploded view of FIG. 5. As indicated in FIG. 2, each void 34 may be of a length approximating the distance across the bases of two adjoining teeth of the corresponding blade element.

As the blade elements in operation are only required to oscillate relatively to one another to only a relatively small extent to effect an efficient scissorslike cutting action in the operation of the tool, so that in the operation of the tool, pockets for the collection of foreign material working between the blade elements 30 tend to be formed between the element-backing members through or by means of the aforementioned voids. This is highly advantageous in the operation of the tool.

For the purpose of maintaining each disposable blade element 30 and its backing member in a relationship so that there is no angular movement of these parts relatively to one another and so that the teeth of each register properly with the teeth of the other, the blade element and the backing member are provided with suitable coacting indexing and supporting means which, as illustrated in the drawings, may take the form of a pair of studs 35 diametrically arranged on the blade element. These studs are received in the openings 29 in the corresponding backing member when the blade element is assembled with the member, and they may be suitably supported from the blade element 30 by any well-known fastening means so as to be axially fixed in a permanent manner with respect thereto. Also, as shown in the drawings, each stud may be provided with a flat as at 36.

As previously indicated, the tip portions of the cutting teeth 31 of the blade elements are subject to the most wear from operation of the implement. When the exposed cutting edges of the teeth 31 become worn, the entire composite blade structure, including the backing members, may be reassembled in the implement after disassembly with the driving yokes 20 and 21 and reassembly therewith after rotation of the entire composite blade structure through an arc of 180 degrees in the manner similar to that described in U.S. Patent No. 2,974,413, so that the lugs on the respective yokes 20 and 21 are received in the other slots 28 in the backing members 25.

It will also be appreciated that the blade elements 30 may be readily disassembled from the backing members 25 for replacement. Also, as previously indicated, the blade elements 30 are disposable and need not be reground.

In operation the disposable blade elements operate in face-to-face relationship with their cutting surfaces in intimate relationship. The cutting effect of the blades is superior and the thin elements provided with cutting edges are supported or backed in an adequate manner so that there is little, if any, tendency of the disposable blade elements to buckle or become angularly dislocated.

While one form of the composite blade structure has been shown and described, it will be apparent to those versed in the art that the invention may take other forms and is susceptible of various changes in details without departing from the scope and principles of the invention as set forth in the appended claims.

What is claimed is:

1. In a composite blade structure, a pair of disklike blade-backing members in opposing spaced-apart relation to one another disposed on a common axis, and a pair of disposable blade elements, one backed by each member in intimate face-to-face relation, said blade elements having toothed cutting edges on their peripheries, coacting means on the blade elements and the respective backing members for supporting the former, and each blade element being provided in an area spaced from the toothed periphery of the element but close thereto with a series of circumferentially arranged and spaced voids, tending to reduce heat generated in said blade elements during the operation of the latter on oscillation of one backing member relatively to the other, pocket means defined by the voids in each of said elements cooperating with the companion backing member, said pocket means providing for the collection of foreign material tending to work between the blade elements during their operation.

2. A composite blade structure as defined in claim 1 wherein the toothed cutting edge of each blade element extends beyond a corresponding toothed portion of the companion backing member, and wherein said coacting means on the backing member and the blade element serves to index the teeth of the blade element with respect to the teeth of the backing member and prevent angular dislocation with respect thereto.

3. A composite blade structure as defined in claim 2 wherein said coacting means on each blade element and its backing member comprises a plurality of studs extending between the blade element and the backing member eccentrically of said axis.

4. A composite blade structure as defined in claim 3 wherein each disposable blade element is removable from its backing member on axial movement of the former relatively to the latter.

5. A composite blade structure as defined in claim 1 wherein the means defining the voids in each blade element are elongated a distance at least approximating the distance across the bases of two adjoining teeth of the element, the blade elements when assembled having the voids in each substantially registering with the voids in the other, so that said pocket means form cavities between the backing members through the blade elements for the collection of foreign material tending to work between the blade elements.

References Cited

UNITED STATES PATENTS

| | | | |
|---|---|---|---|
| 2,974,413 | 3/1961 | Williams | 30—219 |
| 3,184,785 | 5/1965 | Wezel | 30—347 |

FOREIGN PATENTS

| | | |
|---|---|---|
| 445,911 | 4/1936 | Great Britain. |
| 954,745 | 4/1964 | Great Britain. |

WILLIAM FELDMAN, *Primary Examiner.*

G. WEIDENFELD, *Assistant Examiner.*